United States Patent [19]

Amon et al.

[11] Patent Number: 5,658,964

[45] Date of Patent: Aug. 19, 1997

[54] HIGHLY REACTIVE PRINTING INKS

[75] Inventors: Philippe Amon; Haim Bretler, both of Lausanne; Anton Bleikolm, Ecublens; Olivier Rozumek, Chailly; Pierre Degott, Pully, all of Switzerland

[73] Assignee: SICPA Holding S.A., Switzerland

[21] Appl. No.: 466,345

[22] Filed: Jun. 6, 1995

Related U.S. Application Data

[63] Continuation of Ser. No. 447,265, Dec. 7, 1989.

[51] Int. Cl.$^6$ .............................. C03C 17/00; C08F 2/50; C09D 11/10

[52] U.S. Cl. ..................... 522/31; 522/75; 522/79; 522/81; 522/83; 522/95; 522/90; 522/117; 522/181; 522/170; 522/120; 522/100; 522/102; 523/160

[58] Field of Search ............................ 522/31, 25, 170, 522/79, 80, 81, 83, 129, 146, 95, 120, 121, 117, 181, 75, 90, 100, 102; 523/160

[56] References Cited

U.S. PATENT DOCUMENTS

| | | | |
|---|---|---|---|
| 3,205,157 | 9/1965 | Licari et al. | 204/158 |
| 3,708,296 | 1/1973 | Schlesinger | 96/33 |
| 4,069,055 | 1/1978 | Crivello | 522/31 |
| 4,069,056 | 1/1978 | Crivello | 522/31 |
| 4,138,255 | 2/1979 | Crivello | 522/31 |
| 4,256,828 | 3/1981 | Smith | 522/146 |
| 4,593,051 | 6/1986 | Koleske | 522/146 |
| 4,622,349 | 11/1986 | Koleske et al. | 522/31 |
| 4,645,781 | 2/1987 | Koleske et al. | 522/31 |
| 4,751,273 | 6/1988 | Lapin | 525/455 |
| 4,818,776 | 4/1989 | Koleske | 522/31 |
| 4,874,798 | 10/1989 | Koleske et al. | 522/31 |
| 4,892,894 | 1/1990 | Koleske | 552/31 |

FOREIGN PATENT DOCUMENTS 0334056  9/1989  European Pat. Off. .

*Primary Examiner*—Susan W. Berman
*Attorney, Agent, or Firm*—Ostrolenk, Faber, Gerb & Soffen, LLP

[57] ABSTRACT

A printing ink for the printing of security documents by the method of engraved steel die printing, having a viscosity of at least 1 Pa·s at 40° C. under a shear of about 1000 sec$^{-1}$, containing a binder matrix, a polymerization initiator for polymerizable matrix components, fillers and pigments, and the usual additives. The binder matrix contains at least one cationically polymerizable compound, modified to bring about the desired rheology of the ink, and the photoinitiator, activable by UV, heat and EB, is an onium salt capable of releasing a Lewis or Bronsted acid.

This ink has best and very rapid drying characteristics.

18 Claims, No Drawings

HIGHLY REACTIVE PRINTING INKS

This is a continuation of application Ser. No. 07/447,265, filed Dec. 7, 1989 pending.

FIELD OF THE INTENTION

This invention belongs to the field of printing inks. More specifically, it is related to printing inks which are capable of being polymerized by cationic initiation and which are to be used in the method of engraved steel die printing, especially for the printing of security documents such as checks, shares, airline tickets, banknotes, etc.

DESCRIPTION OF THE PRIOR ART

Security documents need to be printed. The printings must be of outstanding high quality and be safe against falsification and counterfeiting.

Security documents are generally printed in a special intaglio printing process. The term "intaglio printing", as a general term, comprises the use of printing ink carrying surfaces, typically printing cylinders or printing plates, where the pattern to be printed is engraved and the engravings are filled with printing ink to be transferred to the printing substrate in order to create the document. The term "intaglio printing" as used in this application shall only mean the so-called "engraved steel die printing process" where chromium plated, engraved steel or nickel plates or cylinders are used, and shall not include the well known rotogravure or gravure printing processes.

Furthermore this invention does not relate to very low viscous printing inks for the conventional gravure printing where a totally different concept of ink formulation is necessary. It is rather related to printing inks having a honey-like or even pasty viscosity for engraved steel die printing.

In engraved steel die rotary printing, a rotating engraved steel cylinder where the pattern or image to be printed is engraved, is supplied with ink by one or more template inking cylinders by which a pattern of inks of different colour is transferred to the printing cylinder. Any excess of ink on the plain surface of the printing cylinder is wiped off by a rotating wiper cylinder covered by a plastisol, using diluted aqueous sodium hydroxide as an emulsifying medium for the wiped-off excess ink, or a paper/calico wiping device, or, otherwise, trichloroethylene. Then, the printing pattern in the engravings of the printing cylinder is transferred, under a pressure up to about 500 bars, on the substrate to be printed which may be paper or plastic material in sheet or web form. These steps and the machines used for engraved steel die printing are known in the art.

The engravings of the printing cylinder have a depth comprised between about 30 and 200 micrometers or even more (whereas rotogravure cylinder engravings are only about 2 to 20 micrometers deep), and the ink transferred to the printed substrate gives a thick and generally strongly pigmented film.

The main requirements for printing inks to be used to print security documents by the engraved steel die method on modern, presently used sheet fed presses or web machinery are the following:

- correct rheological properties at the moment of ink transfer to the printing cylinder and at the moment of printing.
- The ability of the excess ink to be easely and quantitatively removed from the non-printing areas of the die surface (wipeability).
- The ease of cleaning the wiping cylinder by means of a solution of 0.1 to 1% of caustic soda and a similar concentration of a detergent in water or even pure water (detergeability);
- Stability of the ink on the inking rollers and until the moment of printing;
- Film forming characteristics allowing further manipulation of sheets or webs carrying printed films of up to 200 microns thickness 24 hours after printing or respectively immediately after printing.
- Non-offseting properties: In case of web printing at speeds up to 150 m/min, the immediate rewinding of the printed substrate is mandatory. The ink system has to assure that there is no transfer from the printed surface to the substrate in contact therewith.
- In case of web printing with hot air drying devices (as supplied e.g. from TEC-Systems, W. R. Grace & Co.) web speeds of up to 150 m/min., when using engravings of up to 200 microns, have to be assured.
- On sheet fed presses 500 to 10,000 sheets, depending on printing substrate and depth of engraving, have to be stackable in piles right after printing without interleaving;
- outstanding chemical and mechanical resistance of the printing according to specifications established by INTERPOL at the 5th International Conference on Currency and Counterfeiting in 1969 or the Bureau of Engraving and Printing test methods as stated in BEP-88-214 (TN) section M5.
- acceptable toxicological properties.

As it is generally the case in the art of printing, the printed substrates must be dried in order to allow subsequent processing and to achieve the required properties of the final product.

By the term of "drying", two different mechanisms are comprised. The mere physical drying means the evaporation of ink solvents whereas chemical drying, also called hardening or curing, means the transition of a composition from a liquid state into the solid state by polymerization or crosslinking. The printer does generally not make any difference between physical and chemical drying.

Presently, the most widely used drying method is air oxidation. This is a long-lasting drying method, and when documents are printed as sheets and the sheets are stacked, they cannot be handled for further processing before one or more days.

It has therefore been tried for a long time to sensibly reduce the drying time of engraved steel die printings. The so-called "heat set" process uses heat supplied directly by gas burners or infrared lamps, or externally heated air which is directed to the printed sheets. This brings about an accelerated physical and also chemical drying and the possibility to introduce continuous web printing. However, heat set processes have the following serious drawbacks:

- tremendously high energy consumption (air is heated to 130° to 180° C.).
- solvent emissions.
- low absorption of infrared radiation if IR lamps are used and the printings are of light color.
- paper dehydration; the moisture which is removed under heat influence renders the paper more rigid. Dimension stability is poor, compromising the required register, and web rupture is favoured.
- in some cases, drying speed is insufficient.

The last mentioned two drawbacks explain why it is impossible to print banknotes etc. on both faces by engraved steel die printing in one passage on the same press using heat-set methods: Loss of flexibility and compressibility of the printing substrate after drying of the ink film on the first face is seriously impairing the printing quality on the second face. In some cases, drying speed is insufficient causing set-off of the ink in the reel or on the blanket of the counter-pressure cylinder of the second intaglio unit.

Another method for rapidly drying an ink is the use of radiant energy, namely, accelerated electrons supplied by electron cannons (electron beam process), and ultra-violet (UV) radiation.

When electron beams are used, the drying of relatively thick ink layers which contain a high proportion of pigments can be effected in a satisfactory manner. However, serious drawbacks hinder this technique from finding a widespread use:

a) Drying must be carried out in an oxygen free environment which is generally established by streams of nitrogen called "nitrogen blanketing"; this is a costly operation.

b) Problems may arise due to the skin irritating nature and unpleasant odor of a great number of electron beam curable materials.

c) Electron beam curing or drying apparatuses are most expensive.

d) According to the dose rate used, electron beam radiation may have a detrimental effect on the mechanical properties of printing substrates.

The drying by UV radiation has been widely introduced into the printing art. The drying is initiated by radicals, created by the UV radiation, but different from radical formation in electron beam methods. Since the energy of UV rays is low compared with electron beams, the direct scission of radical forming molecules is impossible. Therefore, it is necessary to incorporate a photoinitiator into the printing ink which is decomposed on the impingement of a UV irradiation and will form the free radicals necessary for curing. In this manner, it is virtually impossible to dry or cure the thick and strongly pigmented ink layer obtained in engraved steel die printing. The reasons therefor are the following:

Due to the low energy level of UV, irradiation and the absorption characteristics of many pigments and extenders, the creation of radicals in the bulk of the ink film is drastically reduced;

the chemical nature and the surface treatment of pigments and extenders may further inhibit free radical polymerization;

the ambient oxygen also inhibits the drying through termination reactions;

finally, there is no dark cure since polymerization stops when the irradiation ceases.

OBJECTS OF THE INVENTION

There is a first and major object of this invention to provide energy curable printing inks, especially for the printing of security documents, which are to be printed by the engraved steel die printing method and which can also be cured by UV radiation.

Still another object of the invention is to provide such printing inks which will allow the engraved steel die printing of security documents on both faces of a printing substrate in web or sheet form in one passage on the same press.

And a further object of the invention is to provide such printing inks which employ another mechanism of curing than the already known engraved steel die printing inks and which bring about new and unforeseen advantages and cancels the disadvantages of the drying of known inks.

A further object of the invention is to provide printing inks as defined above which can be cured by sensible or radiating heat, by other energy radiations such as electron beam or UV, or by a combination of radiative and non-radiative energy.

And still another object of this invention is to provide new engraved steel die printing inks of the above indicated kind which allow a perfect and easy wiping of the printing cylinder with the use of water, of diluted sodium hydroxide solutions or trichloroethylene, as well as according to the paper/calico method.

SUMMARY OF THE INVENTION

These objects and still others are met by the new inks of this invention which are chemically curable by cationic mechanisms. This type of polymerization is based upon the discovery that energy is capable of disintegrating certain compounds which liberate cationic species, such as acids, which in turn initiate the polymerization of monomers or propolymers useful in the formulation of printing inks. U.S., Pat. No. 3,708,296 (Schlesinger) and U.S. Pat. No. 3,205,157 (Licari) disclose the photopolymerization of epoxy monomers or prepolymers with the aid of aromatic diazonium salts having a complex anion. On irradiation by UV, the diazonium compound decomposes to yield a catalyst in the form of a Lewis acid or a Bronsted acid which initiates the polymerization of the epoxy compound. However, diazonium salts release nitrogen bubbles when decomposed disturbing seriously the film formation, are thermally unstable so that a stabilizer must be added to the composition, and some pigments react with diazonium salts. U.S. Pat. No. 4,138,255 (Crivello) teaches the cationic polymerization of epoxy resin materials by the use of radiation sensitive aromatic onium salts of Group VIa elements, namely of sulfur, selenium or tellurium. Other onium salts may also appear to be suitable, such as those disclosed in the European patent application No. 0334056 (Crivello).

The inks of this invention thus contain such photoinitiators capable of liberating a Lewis acid or a Bronsted acid on activation by energy. Although these photoinitiators have already been proposed for printing inks, the person skilled in the art could not think of using them in engraved steel die printing inks since the monomers or prepolymers which can be polymerized by cationic initiators are generally of low viscosity, and engraved steel printing inks are of pasty consistence and have to fulfill particular requirements as already pointed out above. Furthermore, the inventors have found that the printings obtained with the engraved steel die printing inks of the invention can also be cured by heat or a combination of heat and UV radiation readily available on existing machinery for security documents printing. This will be described in detail later on.

DETAILED DESCRIPTION OF THE INVENTION

The ink of the invention basically contains four groups of components.

Group A comprises the organic binder matrix. The organic binder contains at least one compound which is capable of being polymerized by a cationic reaction mechanism an activation of a photoinitiator. The organic binder should also impart to the ink system the required rheology for engraved steel die printing. The amount of Group A components generally comprises between about 20 and about 60% by weight of the ink.

Group B comprises at least one onium salt based curing initiator. The amount of Group B components generally comprises between about 1 and about 15% by weight of the ink.

Group C comprises inorganic and/or organic pigments, fillers and extenders. The amount of Group C components may be up to about 60% by weight of the ink.

Group D comprises different additives such as stabilizers, emulgators, dispersing agents, waxes, plasticizers, viscosity and rheology regulators and diluents. The amount of Group D components is comprised between 0 and about 20% by weight of the ink.

The components of the ink are selected such that the cone plate viscosity (shear rate about $1000\ s^{-1}$) at 40° C. is equal to or higher than 1 Pa·s.

Group A basically contains at least one cationically polymerizable material. This term refers to all compounds which contain cationically polymerizable moieties and which can be generally described as follows:

monomeric, oligomeric or polymeric compounds having cationically reactive unsaturated sites, such as vinyl ethers;

compounds containing heterocyclic structures such as cyclic ethers, cyclic acetals, lactones, sulfur containing cycles, etc.; all epoxy materials belong to this class.

All these compounds are known per se; most of them are commercially available and a non-exhaustive list will be given hereafter:

a) oxirane group containing materials: butyl glycidyl ether, butanediol glycidyl ether, $C_{12}-C_{14}$ alkyl glycidyl ether, cresyl glycidyl ether, isooctyl glycidyl ether, 1,6-hexanediol glycidyl ether, bisphenol A ethoxylate diglycidyl ether, glyceryl propoxylate triglycidyl ether, neopentylglycol propoxylate diglycidyl ether, trimethylolpropane ethoxylate triglycidyl ether, 3,4-epoxycyclohexylmethyl-3,4-epoxycyclohexane carboxylate, 1,2-epoxy-p-vinylcyclohexene, bis(3,4-epoxycyclohexyl)adipate, vinylcyclohexene dioxide, 2-(3,4-epoxycyclohexyl-5,5-spiro-3,4-epoxy)cyclohexane-m-dioxane, epoxidized vegetable oil, and low viscosity epoxy resins.

b) vinyl compounds: diethyleneglycol divinyl ether, triethyleneglycol divinyl ether, cyclohexanedimethanol divinyl ether, hydroxybutyl vinyl ether, dipropyleneglycol divinyl ether, tripropyleneglycol divinyl ether, and aliphatic, aralkyl, arylalkoxy mono and divinyl ethers.

As already stated above, none of the aforementioned reactive compounds is capable of bringing about the adequate rheology for engraved steel die printing inks.

In order to overcome these deficiency of the binder matrix A, special formulating techniques including chemical modifications were necessary. Surprisingly, it has been found that the dissolution of cationically non-reactive thermoplastic materials such as cellulose derivatives, homopolymers or copolymers of acrylics and vinylics, oil free polyesters, polyacetals, polyurethanes and other high viscous polymeric materials in the cationically polymerizable compounds listed above allows to achieve the required rheology without impairing the drying capacity of the system.

Another possibility is offered by chemical modifications of the cationically reactive, commercially available basic materials. The polymerizable binder material can be selected from cationically polymerizable monomeric, oligomeric and polymeric unsaturated organic compounds, and hereocyclic compounds capable of undergoing a ring-opening reaction and their mixtures, said compounds having been chain extended in order to raise molecular weight and viscosity.

For example, modification of polyfunctional epoxy derivatives with di or polyfunctional carboxylic acids allows one to impart to the binder matrix A the required rheology while maintaining a sufficient degree of cationic reactivity.

Another possibility to achieve the required viscosity and molecular weight of the binder matrix A is the polyaddition reaction of one or more hydroxy groups containing vinyl ethers on di or polyisocyanates. Such compounds as well as methods to obtain them are disclosed in U.S. Pat. No. 4,751,273 (Lapin et al) which is incorporated in this specification by reference.

Of course, any combination of the above mentioned modifications is possible. The man skilled in the art will be able to determine the precise ratios.

Group B components comprise at least one energy sensitive onium salt capable of liberating a cationic polymerization initiator or catalyst under the influence of applied energy. Particularly preferred are salts of the formula $Ar_3\ S^+\ X^-$ wherein Ar is a monovalent aromatic radical, S is sulfur, and $X^-$ is $[MF_6]^-$ wherein M is P, As or Sb.

The compounds of group B are generally known per se. In the prior art, they are termed as radiation sensitive initiators, see U.S. Pat. No. 4,138,255 and EP-A2-0 334 056 (both to Crivello) incorporated in this description by reference. This means to the person skilled in the art that they can be activated by UV light or electron beams. They can also be activated by the application of thermal energy, namely hot fluids such as hot air of about 120° to 280° C. or infrared waves. Surprisingly, it has been found that the energy sensitive initiators used in this invention, are appropriate to cure or dry highly pigmented or charged inks. The Crivello references do not disclose the presence of inert components in the curable mixtures it could not be expected that highly filled inks containing up to 60% by weight of inert materials would cure in a relatively short time.

Group C components are generally not different from those currently used in intaglio printing inks. Any organic and inorganic pigment appropriate for printing inks may be used; these colour pigments are well known to the man skilled in the art and need not be described in detail. The same applies to the extenders or fillers; examples thereof are calcium carbonate, barium sulfate and titanium dioxide.

Group D components are also those which are currently used in engraved steel die printing inks; they comprise, for example, stabilizers to assure a predetermined pot-life of the ink, emulsifiers and dispersing agents for the pigments and the extenders, plasticizers for the regulation of the flexibility of the final film, cationically polymerizable and/or non-reactive diluents for adjusting flow and transfer characteristics of the ink, and others.

The cationically curing printing inks of this invention bring about the following particular advantages:

Curing is accomplished throughout the whole mass of the printed marks and is not confined to surface regions.

Curing proceeds rapidly throughout the mass of the printed marks even after removing the energy source ("dark cure").

Curing is accomplished on the application of heat, UV rays, electron beams and other irradiations including IR.

Curing is not oxygen inhibited, and nitrogen blanketing is no longer necessary.

The initiators have a perfectly satisfactory stability as to time (shelf life) and also to moderately elevated temperatures.

Most of the energy sensitive initiators are acceptable in terms of toxicity.

No gas bubbles are released during curing.

Curing is accomplished with a minimum of volume change which assures good adhesion properties of the printed ink film.

As it has already been mentioned above, UV irradiation is the preferred curing method for the inks of the invention. UV curing has effectively numerous advantages on other curing or drying methods: Low capital requirement for UV sources and devices, enhanced curing speed due to the IR portion of the irradiation no negative influence on the mechanical properties of security document paper, etc.

The conditions of curing the printings made with polymerizing inks are well known to the one skilled in the art. These conditions are the same for the polymerizing inks of this invention.

For special purposes, the inks of this invention, characterized by a cationic polymerization reaction mechanism for curing, may be blended with other engraved steel die printing inks capable of curing by other reaction mechanisms, known in the art, such as oxypolymerization, UV or electron beam induced free radical polymerization, or others.

The invention will now be explained further by composition Examples which are given for illustration purposes only and which will not limit the invention thereto.

EXAMPLE I

Part I

Synthesis of a cationically polymerizable binder varnish: 96 parts of a cycloaliphatic epoxide (3,4-epoxycyclohexylmethyl-3,4-epoxycyclohexane carboxylate solid as CYRACURE UVR 6110—Union Carbide) are heated in the appropriate vessel under nitrogen at 130° C. 4 parts of fumaric acid acid are added and allowed to react for about 2 hours, while the temperature is raised to 150°–155° C. The final acid number of the reaction product is 0.2 mg KOH/g and the varnish has a viscosity of 18 Pa·s at 40° C.

Part II

A UV cationically polymerizable printing ink is manufactured by classical means (e.g. mixing of all ingredients, then grinding on 3 roller-mills) according to the following formula:

Component of Group A 54 parts of the cationically polymerizable varnish as described in part I Component of Group B 7 parts of onium salt based initiator (CYRACURE UVI 6974—Union Carbide)

Components of Group C 7 parts of Red pigment: (CHROMOPHTAL BRN—Ciba Geigy)

16 parts of silicom dioxide (AEROSIL 200 —Degussa)

Components of Group D 5 parts of micronizod polyethylene wax (CERIDUST 9615A—Hoechst)

1 part of surfactant (SILWET L 7604—Union Carbide)

10 parts of viscosity regulator (TRIETHYLENE GLYCOL—Dow Chemicals)

The ink has a viscosity of 12.5 Pa·s at 40° C. It shows an excellent response to cure with UV light, as well as a very good dark cure. The ink is paper wipeable and fulfills all the requirements needed by engraved steel die inks to be used for printing of security documents.

EXAMPLE II

Part I

Manufacturing of a cationically polymerizable binder varnish 88 parts of a cycloaliphatic epoxide (CYRACURE UVR 6110—Union Carbide) are heated under nitrogen at 100° C. in appropriate vessel. 12 parts of a polyvinyl butyral resin (MOWITAL B60-M—Hoechst) are then portionwise introduced while agitating vigorously until complete dissolution is achieved. Final viscosity is 13 Pa·s at 40° C.

Part II

A UV cationically polymerizable ink is manufactured by classical means, according to the following formula:

Components of Group A 54 parts of the cationically polymerizable binder varnish as described in part I 10 parts of a cycloaliphatic epoxide (CYRACURE UVR 6110—Union Carbide)

Components of Group B 7 parts of onium salt based initiator (CYRACURE UVI 6974—Union Carbide)

Components of Group C 7 parts of Red pigment (CHROMOPHTAL BAN-Ciba—Geigy) 16 parts of micronized talcum (MICRO-TALE AT 1—Norwegian Talc)

Components of Group D 5 parts of micronized polyethylene wax (CERIDUST 9615A—Hoechst) 1 part of a surfactant (SILWET L 7604—Union Carbide)

The ink has a viscosity of 14 Pa·s at 40° C. It is paper wipeable and shows the same excellent properties as the ink described in example I.

The new inks of the invention are used in the same manner as the inks known before. They are valuable compositions for the printing of security documents, such as banknotes, checks, traveller checks, credit cards, stamps, shares, passports, airline tickets, labels and similar documents for which measures against counterfeiting and forgery are necessary or indicated.

The preceding description clearly shows the surprising compositions of this invention. It is evident that the practical realization of the invention in the context of the claimed matter may be varied or modified according to the knowledge of the man skilled in the art without departing from the principles and the scope of this invention. Particularly in the field of printing, numerous modifications and improvements are possible in the formulation of printing inks. However, such modifications and improvements are comprised in the scope of protection of this invention.

We claim:

1. A printing ink for the use in engraved steel die printing, having an engraved steel die printing ink rheology comprising a cone plate viscosity of at least 1 Pa·s at 40° C. and at a shear rate of about 100 s$^{-1}$ and being of pasty consistency, the ink containing:

up to 60% by weight of the ink of at least one colour pigment, an effective amount of a radiation energy sensitive cationic aromatic onium salt capable of liberating a cationic polymerization initiator under the influence of applied energy, from 20 to 60% by weight of the ink of a binder composition having a sufficiently high viscosity to ensure the required rheology of the ink, the binder composition comprising:

at least one compound capable of being polymerized according to a cationic reaction mechanism, and being selected from monomeric, oligomeric and polymeric unsaturated organic compounds and heterocyclic compounds capable of undergoing a ring opening reaction, said compound being chain extended by polyesterification or polyurethanisation or both in order to raise its molecular weight and its viscosity, and a cationically non-reactive, thermoplastic polymeric material to impart the required rheology of the ink without impairing the drying capacity of the ink.

2. The ink of claim 1, wherein said radiation energy sensitive aromatic onium salt has the formula $Ar_3S^+(MF_6)^-$ wherein Ar is a monovalent aromatic radical and M is P, As or Sb.

3. The ink of claim 1, wherein said radiation energy sensitive aromatic onium salt has the formula $(Ar')_2I^+(MF_6)^-$ or $(Ar')_3S^+(MF_6)^-$ wherein the Ar' are monovalent aromatic radicals, at least one of them being substituted with an OR group attached to the aryl nucleus via its oxygen atom, R being an alkyl radical having at least 8 carbon atoms, and M is arsenium, bismuth or phosphorus.

4. The ink of claim 1, wherein said polymerization initiator is sensitive to ultraviolet radiation.

5. The ink of claim 1, wherein said salt is capable of liberating said initiator in response to hot fluids having a temperature of from 120° C. to 250° C.

6. The ink of claim 1, wherein said liberated cationic polymerization initiator is a Lewis acid or Bronsted acid.

7. The ink of claim 1, wherein the ink contains at least one extender and further contains ink conditioning additives.

8. The ink of claim 7, wherein the cationic salt is present in an amount of from 1 to 15% by weight, and the ink conditioning additives are present in an amount of up to 20% by weight of the ink.

9. The ink of claim 1 having a viscosity of at least 12.5 Pa·s.

10. A printing ink for the use in engraved steel die printing, having an engraved steel die printing ink rheology comprising a cone plate viscosity of at least 1 Pa·s at 40° C. and at a shear rate of about 1000 s$^{-1}$ and being of pasty consistency, the ink containing:

up to 60% by weight of the ink of a material comprising at least one colour pigment, an effective amount of a radiation energy sensitive cationic aromatic onium salt capable of liberating a cationic polymerization initiator under the influence of applied energy, from 20 to 60% by weight of the ink of a binder composition having a sufficiently high viscosity to ensure the required rheology of the ink, the binder composition comprising a cationically polymerizable material selected from monomeric, oligomeric and polymeric unsaturated organic compounds and heterocyclic compounds capable of undergoing a ring opening reaction, said material having been chain extended by polyesterification or polyurethanisation or both in order to raise its molecular weight and its viscosity.

11. The ink of claim 10, wherein said radiation energy sensitive aromatic onium salt has the formula $Ar_3S^+(MF_6)^{31}$ wherein Ar is a monovalent aromatic radical and M is P, As or Sb.

12. The ink of claim 10, wherein said radiation energy sensitive aromatic onium salt has the formula $(Ar')_2I^+(MF_6)^-$ or $(Ar')_3S^+(MF_6)^-$ wherein the Ar' are monovalent aromatic radicals, at least one of them being substituted with a —OR group attached to the aryl nucleus via its oxygen atom, R being an alkyl radical having at least 8 carbon atoms, and M is arsenium, bismuth or phosphorus.

13. The ink of claim 10, wherein said polymerization initiator is sensitive to ultraviolet radiation.

14. The ink of claim 10, wherein said salt is capable of liberating said initiator in response to hot fluids having a temperature of from 120° C. to 250° C.

15. The ink of claim 10, wherein said liberated cationic initiator is a Lewis acid or Bronsted acid.

16. The ink of claim 10, wherein the ink contains at least one extender and further contains ink conditioning additives.

17. The ink of claim 16, wherein the cationic salt is present in an amount of from 1 to 15% by weight, and the ink conditioning additives are present in an amount of up to 20% by weight of the ink.

18. The ink of claim 10 having a viscosity of at least 12.5 Pa·s.

* * * * *